US008480481B2

(12) United States Patent
Vann

(10) Patent No.: US 8,480,481 B2
(45) Date of Patent: Jul. 9, 2013

(54) SYSTEMS, METHODS, AND DEVICES FOR PLAYING WAGERING GAMES WITH RANDOMLY SELECTED MATHEMATICAL OPERATION APPLIED TO GAME FACTORS

(75) Inventor: Jamie Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 42 days.

(21) Appl. No.: 13/248,509

(22) Filed: Sep. 29, 2011

(65) Prior Publication Data

US 2013/0084937 A1 Apr. 4, 2013

(51) Int. Cl.
*G06F 17/00* (2006.01)

(52) U.S. Cl.
USPC .......... 463/20

(58) Field of Classification Search
USPC .......... 463/16–25
See application file for complete search history.

(56) References Cited

U.S. PATENT DOCUMENTS

| | | | | |
|---|---|---|---|---|
| 5,782,471 | A | 7/1998 | Bautista et al. | |
| 6,506,118 | B1 | 1/2003 | Baerlocher et al. | |
| 6,843,723 | B2 * | 1/2005 | Joshi | 463/25 |
| 7,458,889 | B2 | 12/2008 | Gauselmann | |
| 7,674,180 | B2 | 3/2010 | Graham et al. | |
| 7,883,406 | B2 | 2/2011 | Vancura | |
| 7,967,674 | B2 | 6/2011 | Baerlocher | |
| 7,993,199 | B2 | 8/2011 | Iddings et al. | |
| 7,997,580 | B2 | 8/2011 | Luciano, Jr. | |
| 8,262,469 | B2 * | 9/2012 | Iddings et al. | 463/25 |
| 8,317,587 | B2 * | 11/2012 | Gomez et al. | 463/16 |
| 2002/0052232 | A1 | 5/2002 | Kaminkow | 463/20 |
| 2003/0036422 | A1 | 2/2003 | Baerlocher et al. | 463/20 |
| 2003/0073477 | A1 | 4/2003 | Baerlocher et al. | 463/16 |
| 2004/0082384 | A1 | 4/2004 | Walker et al. | 463/40 |
| 2004/0176162 | A1 * | 9/2004 | Rothschild | 463/29 |
| 2005/0130731 | A1 * | 6/2005 | Englman et al. | 463/20 |
| 2005/0130737 | A1 * | 6/2005 | Englman et al. | 463/25 |
| 2006/0073874 | A1 | 4/2006 | Cregan et al. | 463/20 |
| 2006/0287036 | A1 * | 12/2006 | Daly et al. | 463/16 |
| 2007/0004494 | A1 | 1/2007 | Taylor | 463/16 |
| 2007/0026924 | A1 | 2/2007 | Taylor | 463/16 |
| 2008/0039174 | A1 | 2/2008 | Litman | 463/20 |
| 2009/0005158 | A9 | 1/2009 | Kelly et al. | 463/25 |

FOREIGN PATENT DOCUMENTS

| | | |
|---|---|---|
| WO | 2010/144390 | 12/2010 |

OTHER PUBLICATIONS

Truth in Gaming: Toward Consumer Protection in the Gambling Industry, keggert@chapman.edu, Maryland Lew Review, Inc; Kurt Eggert, 61 pages, Copyright@2004.

* cited by examiner

*Primary Examiner* — Ronald Laneau
(74) *Attorney, Agent, or Firm* — Nixon Peabody LLP

(57) ABSTRACT

A gaming system for playing a wagering game includes a controller configured to randomly generate an outcome of the wagering game and activate, for a winning outcome, a game feature responsive to an occurrence of a predetermined symbol along an activated payline. The controller randomly determines and displays a first operand and a second operand in an award modifier calculation and randomly determines and displays a mathematical operator to apply to the first and second operands. The controller applies the randomly determined mathematical operator to the first operand and the second operand to yield a modifier, modifies an award associated with the winning outcome using the modifier to yield a modified award, and awards the modified award.

30 Claims, 13 Drawing Sheets

SYSTEMS, METHODS, AND DEVICES FOR PLAYING WAGERING GAMES WITH RANDOMLY SELECTED MATHEMATICAL OPERATION APPLIED TO GAME FACTORS

COPYRIGHT

A portion of the disclosure of this patent document contains materials which are subject to copyright protection. The copyright owner has no objection to the facsimile reproduction by anyone of the patent disclosure, as it appears in the U.S. Patent and Trademark Office patent files or records, but otherwise reserves all copyright rights whatsoever.

TECHNICAL FIELD

The present disclosure relates generally to wagering games, as well as systems and devices for playing wagering games. More particularly, the present disclosure relates to systems, methods, and devices for playing wagering games with randomly selected mathematical operation applied to game factors.

BACKGROUND

Gaming machines, such as slot machines, video poker machines, video black-jack machines, and the like, have been a cornerstone of the gaming industry for several years. Generally, the popularity of such machines with players is dependent on the likelihood (or perceived likelihood) of winning money at the machine and the intrinsic entertainment value of the associated wagering game relative to other available gaming options. Where the available gaming options include a number of competing machines and the expectation of winning at each machine is roughly the same (or believed to be the same), players are likely to be attracted to the most entertaining and exciting machines. Shrewd operators therefore strive to employ the most entertaining and exciting machines, features, and enhancements available because such machines attract frequent play and hence increase profitability to the operator.

One concept that has been successfully employed to enhance the entertainment value of a game is that of a "secondary" or "bonus" game which may be played in conjunction with a "basic" game. The bonus game, which is typically entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment and achieve player loyalty is the use of progressive games. In the gaming industry, a "progressive" game historically involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position normally corresponds to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. Typically, once the progressive jackpot is awarded, the jackpot amount is reset to the predetermined minimum amount.

While some currently available game features provide some enhanced excitement, there is a continuing need to develop new features for wagering games to satisfy the demands of players and operators.

SUMMARY

According to aspects of the present disclosure, gaming systems, machines and methods is presented for conducting a wagering game.

A gaming system for playing a wagering game includes a wager input device configured to receive a wager to play the wagering game and activate at least one payline, at least one display device configured to display the wagering game, and at least one controller operatively configured to randomly generate an outcome of the wagering game, determine if the outcome is a winning outcome, activate, for a winning outcome, a game feature responsive to an occurrence of at least one predetermined symbol along an activated payline, randomly determine a first operand in an award modifier calculation, display the determined first operand on the at least one display device, randomly determine a second operand in an award modifier calculation, display the determined second operand on the at least one display device, randomly determine a mathematical operator from amongst a plurality of different mathematical operators to apply to the first operand and the second operand, display the determined mathematical operator on the at least one display device, apply the randomly determined mathematical operator to the first operand and the second operand to yield a modifier, display the modifier on the at least one display device, modify an award operatively associated with the winning outcome via a paytable using the modifier to yield a modified award, and award the modified award.

According to another aspect of the present disclosure, a wagering game system is configured to conduct a wagering game or one or more wagering game machines, the wagering game system comprising at least one wagering game machine comprising a wager input device configured to receive a wager to play the wagering game and activate at least one payline, one or more player input devices, and at least one display device configured to display the wagering game and at least one controller, operatively associated with the at least one wagering game machine. The at least one controller is configured to conduct a game feature, upon execution of instructions, to randomly determine, in association with the game feature, a first operand in an award modifier calculation and display, in association with the game feature, the determined first operand on the at least one display device. The at least one controller is configured to conduct a game feature, upon execution of instructions, to randomly determine, in association with the game feature, a second operand in the award modifier calculation and display, in association with the game feature, the determined second operand on the at least one display device. The at least one controller is configured to conduct a game feature, upon execution of instructions, to randomly determine, in association with the game feature, a mathematical operator from amongst a plurality of different mathematical operators to apply to the first operand and the second operand in the award modifier calculation and to display, in association with the game feature, the determined mathematical operator on the at least one display device. The at least one controller is configured to conduct a game feature, upon execution of instructions, to apply, in association with the game feature, the randomly determined mathematical operator to the first operand and the second operand in the award modifier calculation to yield a modifier and to display, in association with the game feature, the modifier on the at least one display device. The at least one controller is configured to conduct a game feature, upon execution of instructions, to modify, using the modifier, an award operatively associated with a winning outcome in a game other than the game feature to yield a modified award and award the modified award.

According to further aspects of the present disclosure, a wagering game system is configured to conduct a wagering game or one or more wagering game machines, the wagering game system comprising at least one wagering game machine comprising a wager input device configured to receive a wager to play the wagering game and activate at least one payline, one or more player input devices, and at least one display device configured to display the wagering game and at least one controller, operatively associated with the at least one wagering game machine. The at least one controller is configured to conduct a game feature, upon execution of instructions, to randomly determine, in association with the game feature, a first operand in an award modifier calculation and display, in association with the game feature, the determined first operand on the at least one display device. The at least one controller is further configured, upon execution of instructions, to randomly determine, in association with the game feature, a second operand in an award modifier calculation and display, in association with the game feature, the determined second operand on the at least one display device. The at least one controller is further configured, upon execution of instructions, to randomly determine, in association with the game feature, a mathematical operator from amongst a plurality of different mathematical operators to apply to the first operand and the second operand and display, in association with the game feature, the determined mathematical operator on the at least one display device. The at least one controller is further configured, upon execution of instructions, to apply, in association with the game feature, the randomly determined mathematical operator to the first operand and the second operand to yield a modifier and to display, in association with the game feature, the modifier on the at least one display device. The at least one controller is further configured, upon execution of instructions, to modify, using the modifier, another outcome randomly determined in the game feature to yield an award resulting from said another outcome and said modifier and award the award.

According to other aspects of the present disclosure, a method for conducting a wagering game on a wagering game system comprising one or more wagering game machines comprises the acts of randomly determining, using a controller, a first operand in an award modifier calculation and displaying, on a display associated with a wagering game machine, the determined first operand. The method further includes acts of randomly determining, using the controller, a second operand in an award modifier calculation and displaying, on the display associated with the wagering game machine, the determined second operand. The method further includes acts of randomly determining, using the controller, a mathematical operator from amongst a plurality of different mathematical operators to apply to the first operand and the second operand and displaying, on the display associated with the wagering game machine, the determined mathematical operator. The method further includes acts of calculating a modifier, using the controller, by applying the randomly determined mathematical operator to the first operand and the second operand and displaying the modifier on the display associated with the wagering game machine. The method further includes acts of modifying an award using the modifier using a controller and awarding the modified award.

According to further aspects of the present disclosure, a gaming system for playing a wagering game comprises at least one wagering game machine configured to conduct the wagering game and at least one controller. The at least one controller is operatively configured to randomly generate an outcome of the wagering game, determine if the outcome is a winning outcome, determine an award associated with the winning outcome, activate a game feature responsive to a winning outcome satisfying one or more predetermined triggers, and randomly determine a first operand in an award modifier calculation. The at least one controller is also operatively configured to display the determined first operand on at least one display device associated with the wagering game machine, randomly determine a second operand in an award modifier calculation, display the determined second operand on said at least one display device associated with the wagering game machine, randomly determine a mathematical operator from amongst a plurality of different mathematical operators to apply to the first operand and the second operand, and display the determined mathematical operator on said at least one display device associated with the wagering game machine. The at least one controller is also operatively configured to apply the randomly determined mathematical operator to the first operand and the second operand to yield a modifier, display the modifier on said at least one display device associated with the wagering game machine, modify the award associated with the winning outcome, using the modifier, to yield a modified award, and award the modified award via the wagering game machine.

According to further aspects of the present disclosure, a wagering game system configured to conduct a wagering game or one or more wagering game machines, the wagering game system comprising at least one wagering game machine configured to conduct the wagering game and at least one controller, operatively associated with the at least one wagering game machine, configured to conduct a game feature, upon execution of instructions. The at least one controller is operatively configured to randomly determine, in association with the game feature, a first operand in an award modifier calculation and display, in association with the game feature, the determined first operand on a display device associated with the wagering game machine. The at least one controller is also operatively configured to randomly determine, in association with the game feature, a second operand in the award modifier calculation and display, in association with the game feature, the determined second operand on the display device associated with the wagering game machine. The at least one controller is also operatively configured to randomly determine, in association with the game feature, a mathematical operator from amongst a plurality of different mathematical operators to apply to the first operand and the second operand in the award modifier calculation and display, in association with the game feature, the determined mathematical operator on the display device associated with the wagering game machine. The at least one controller is also operatively configured to apply, in association with the game feature, the randomly determined mathematical operator to the first operand and the second operand in the award modifier calculation to yield a modifier, display, in association with the game feature, the modifier on the display device associated with the wagering game machine, modify, using the modifier, an award operatively associated with a winning outcome in a game other than the game feature to yield a modified award and award the modified award.

According to further aspects of the present disclosure, a wagering game system configured to conduct a wagering game or one or more wagering game machines, the wagering game system comprising at least one wagering game machine and at least one controller, operatively associated with the at least one wagering game machine, configured to conduct a game feature, upon execution of instructions. The at least one controller is operatively configured to randomly determine, in association with the game feature, a first operand in an award modifier calculation, display, in association with the game feature, the determined first operand on a display device associated with the wagering game machine, and randomly determine, in association with the game feature, a second operand in an award modifier calculation. The at least one controller is also operatively configured to display, in association with the game feature, the determined second operand on the display device associated with the wagering game machine, randomly determine, in association with the game feature, a mathematical operator from amongst a plurality of different mathematical operators to apply to the first operand and the second operand, and display, in association with the game feature, the determined mathematical operator on the display device associated with the wagering game machine. The at least one controller is also operatively configured to apply, in association with the game feature, the randomly determined mathematical operator to the first operand and the second operand to yield a result, and display, in association with the game feature, the result on the display device associated with the wagering game machine.

According to further aspects of the present disclosure, a method for conducting a wagering game on a wagering game system comprising one or more wagering game machines, the method comprising triggering a game feature in association with a wagering game conducted on a wagering game machine of the wagering game system, randomly determining, using a controller for the wagering game system, a first operand in an award modifier calculation, and displaying, on a display associated with a wagering game machine, the determined first operand. The method also includes randomly determining, using the controller, a second operand in an award modifier calculation, displaying, on the display associated with the wagering game machine, the determined second operand, randomly determining, using the controller, a mathematical operator from amongst a plurality of different mathematical operators to apply to the first operand and the second operand, and displaying, on the display associated with the wagering game machine, the determined mathematical operator. The method also includes calculating a modifier, using the controller, by applying the randomly determined mathematical operator to the first operand and the second operand, displaying the modifier on the display associated with the wagering game machine, modifying an award, via the controller, using the modifier, and awarding the modified award via the wagering game machine.

According to even yet another aspect of the present disclosure, one or more non-transient computer readable storage media are encoded with instructions for directing a gaming device or a gaming system to perform any of the acts or methods disclosed herein.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and best mode(s) for carrying out the present invention when taken in connection with the accompanying drawings and the appended claims.

Figure 1A:
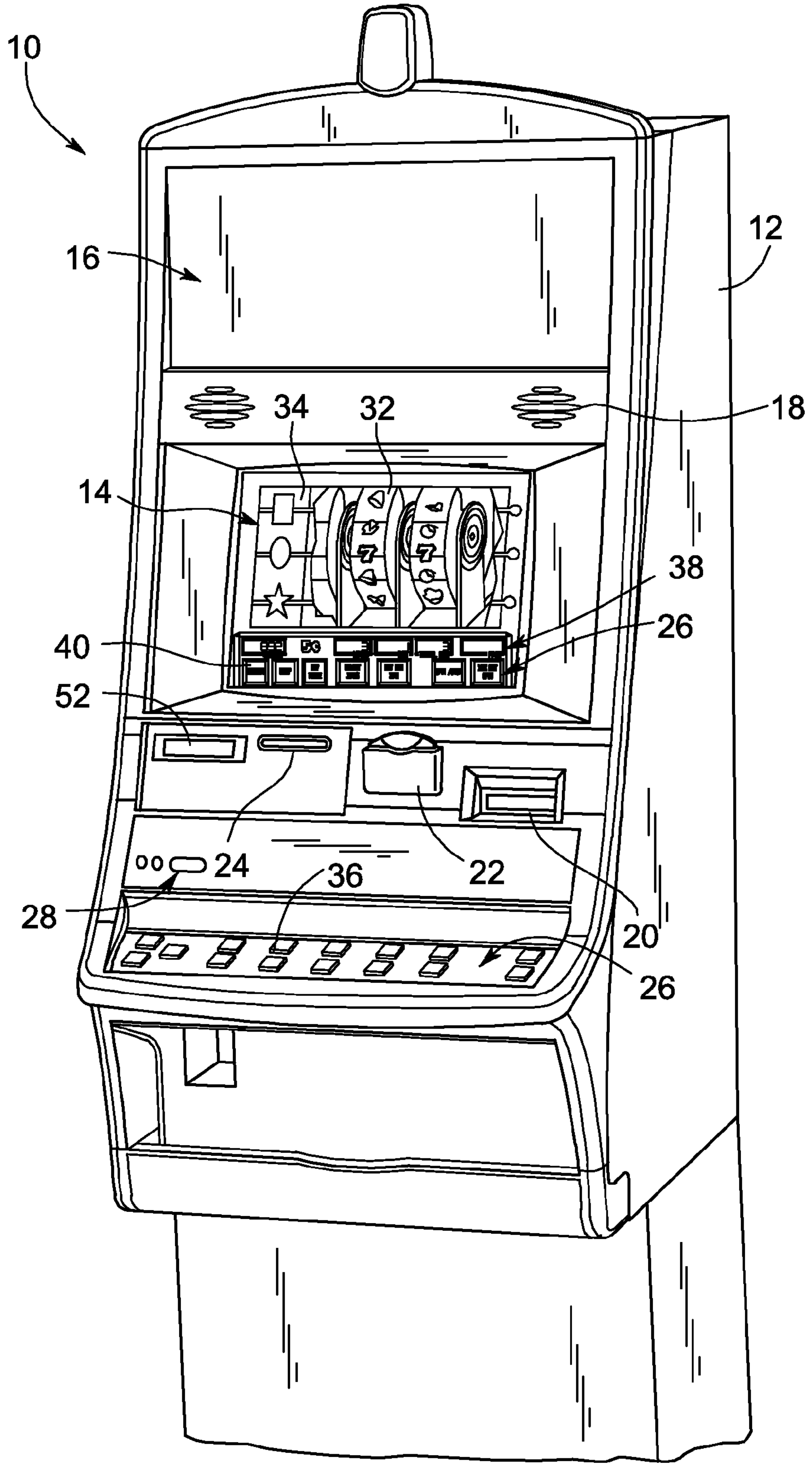
FIG. 1A is a perspective-view illustration of an example of an upright free-standing gaming terminal in accordance with aspects of the present disclosure.

While the aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there are shown in the drawings and will herein be described in detail representative embodiments with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary, and Detailed Description of the Embodiments sections, but not explicitly set forth in the claims, should not be incorporated into the claims, singly or collectively, by implication, inference or otherwise.

Referring to FIG. 1A, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

Figure 1B:
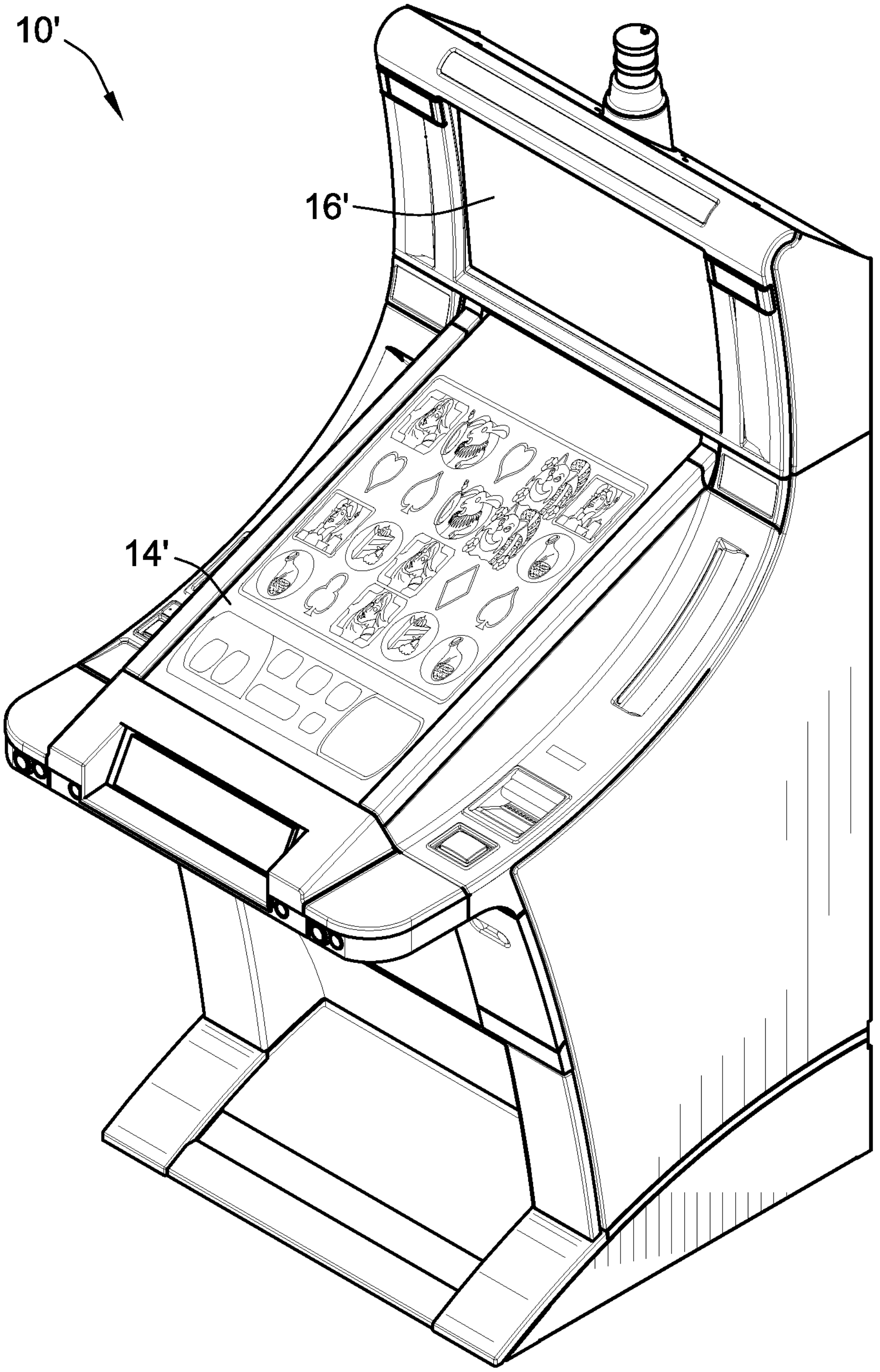
FIG. 1B is a perspective-view illustration of an example of a slant-top free-standing gaming terminal in accordance with aspects of the present disclosure.

The gaming terminal 10 illustrated in FIG. 1A, and likewise the gaming terminal 10' illustrated in FIG. 1B, comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 in FIG. 1A are described below, it should be understood that numerous other peripheral devices and other elements exist and are readily utilizable in any number of combinations to create various forms of a gaming terminal in accord with the present concepts and are all equally and fully application to the gaming terminal 10' illustrated in FIG. 1B.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area. In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1A, a mouse, a joy stick, a switch, a microphone, and/or a touch screen 38 mounted over the primary display area 14 and/or the secondary display area 16 and having one or more soft touch keys 40, as is also shown in FIG. 1A. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
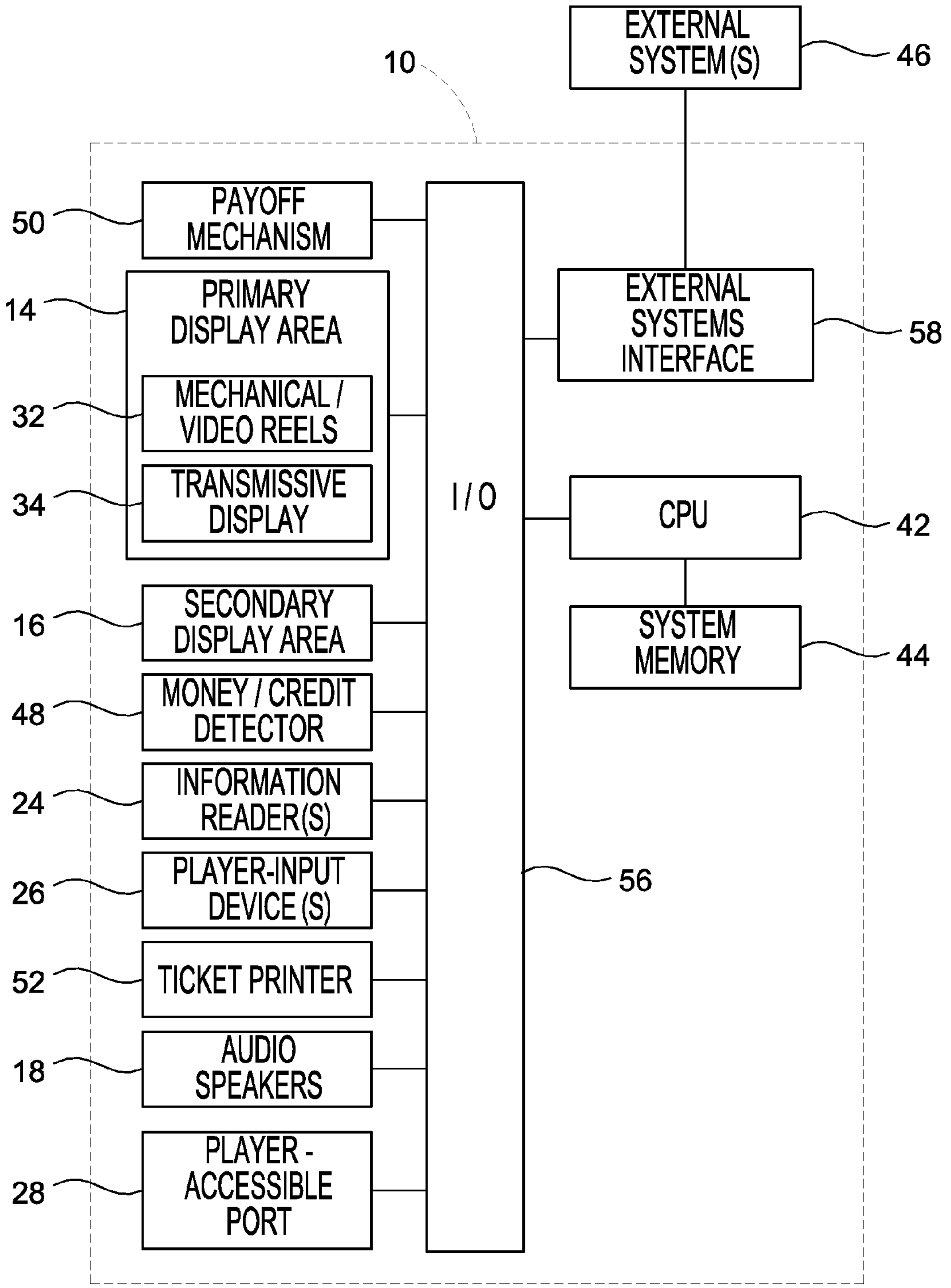
FIG. 2 is a schematic diagram of an exemplary gaming system according to aspects of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering-game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+front-side bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
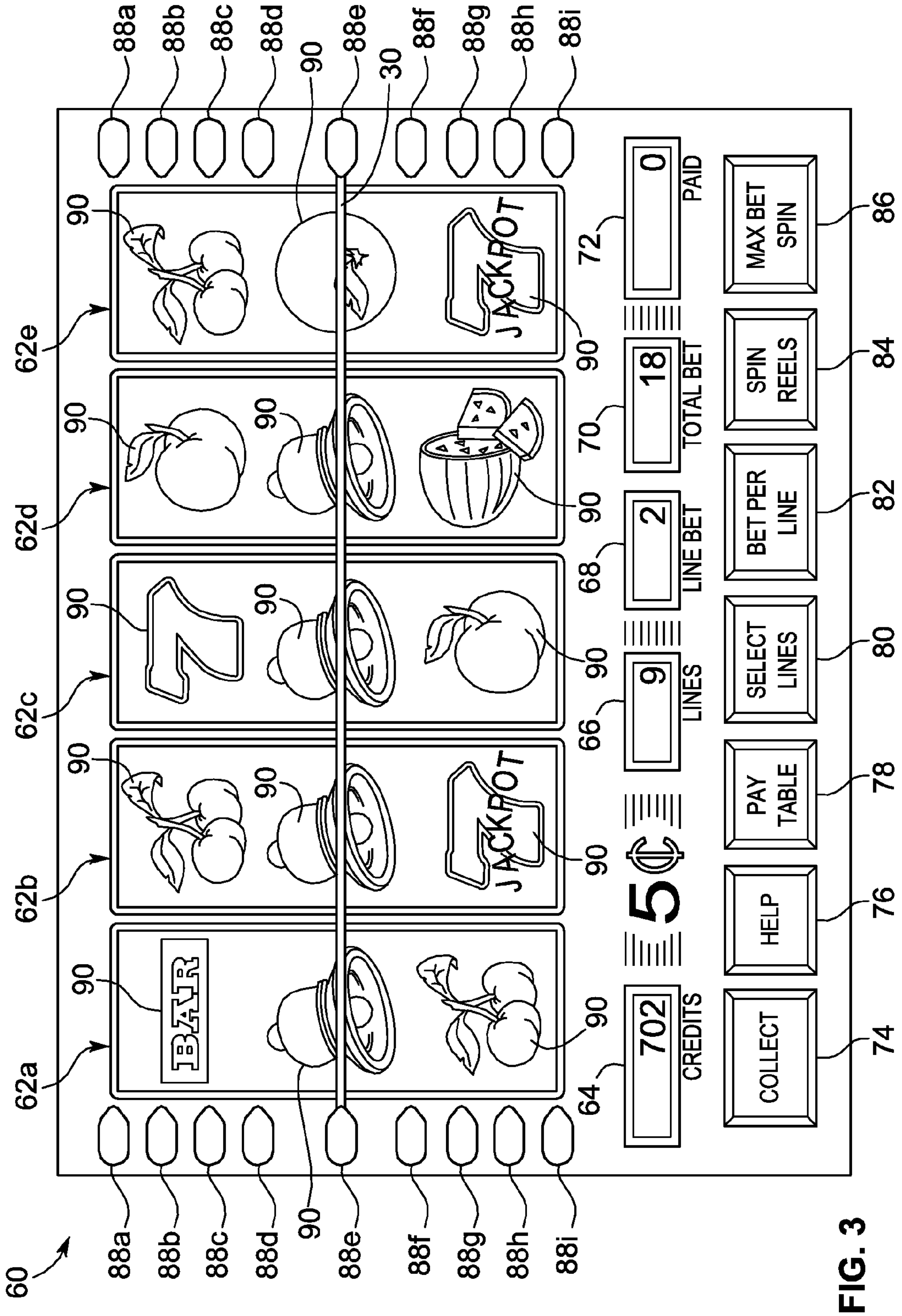
FIG. 3 is a screen shot of a basic-game screen from an exemplary wagering game that can be played, for example, on the gaming terminals of FIG. 1A or 1B, or the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accordance with various methods of conducting a wagering game on a gaming system in accord with the present concepts, the wagering game includes a game sequence in which a player makes a wager, such as through the money/credit detector 48, touch screen 38 soft key, button panel, or the like, and a wagering-game outcome is associated with the wager. The wagering-game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering-game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30, one of which is shown in FIG. 3 for clarity, extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
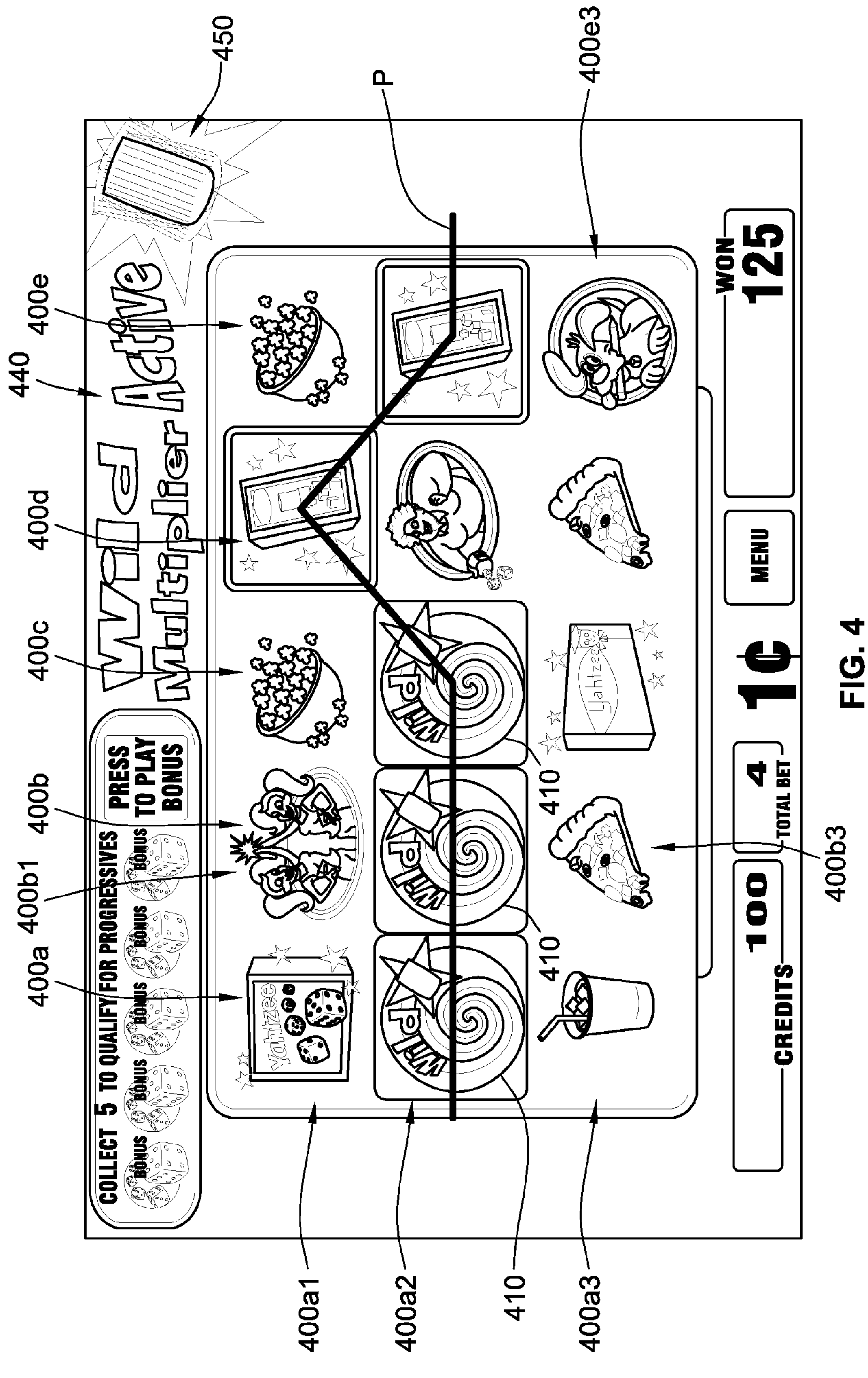
FIG. 4 is a representation of a screen shot from an exemplary wagering game, in accord with at least some aspects of the present concepts, that can be played, for example, on the gaming terminals of FIG. 1A or 1B, or the gaming system of FIG. 2.

Turning now to FIG. 4, an example of a game feature in accord with at least some aspects of the present concepts is illustrated. FIG. 4's representative screen shot of a wagering game in-progress shows a state wherein the reels 400*a*-400*e* have stopped to reveal a winning outcome along a selected payline "P," wherein the "WILD" symbol 410 in each of symbol positions 400*a*2, 400*b*2, and 400*b*3, respectively form a winning combination with the like "YAHTZEE" symbols in symbol positions 400*d*1 and 400*e*2. As used in this example, the reel symbol positions are denoted by both the reel (e.g., 400*a*) and symbol position (e.g., 1 is the top position, 2 is the middle position, and 3 is the bottom position). It is to be understood that this illustrated winning combination and the indicated bet and won amounts are entirely arbitrary and are intended to illustrate general concepts, not actual game mathematics.

Figure 6A:
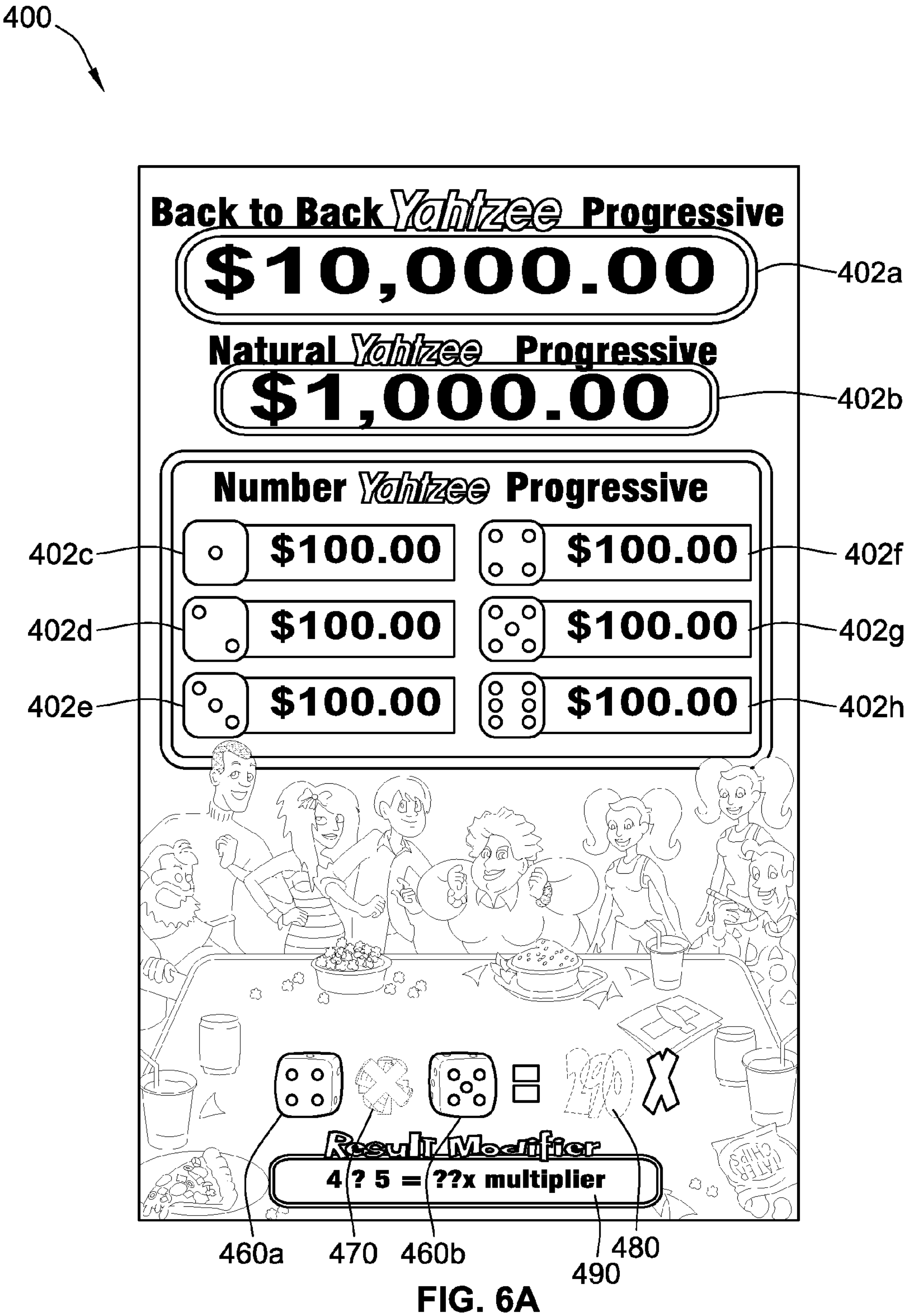
FIG. 6A is a representation of a screen shot from an exemplary wagering game, in accord with at least some aspects of the present concepts, temporally following the representation of the screen shot of FIG. 5.
Figure 6B:
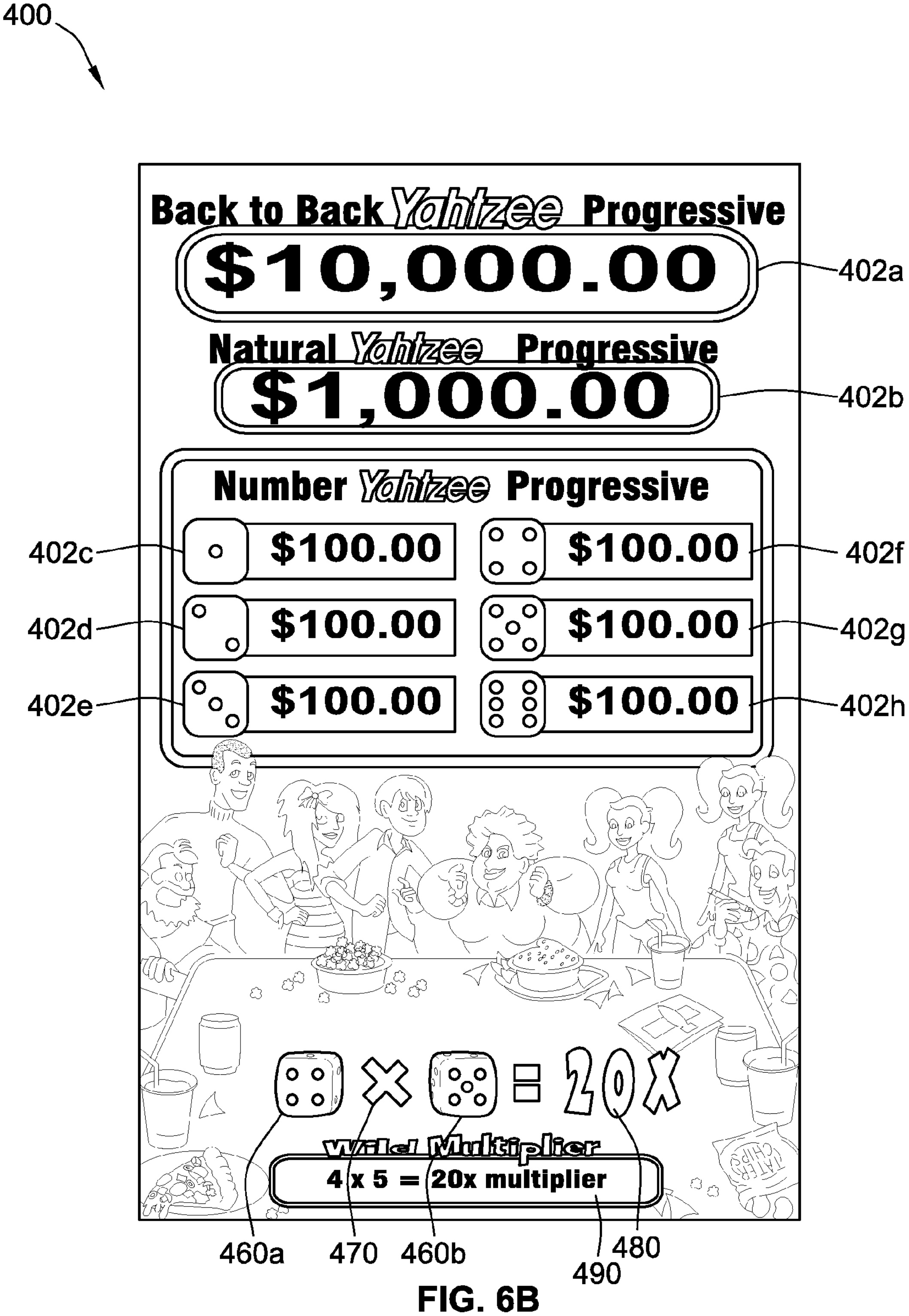
FIG. 6B is a representation of a screen shot from an exemplary wagering game, in accord with at least some aspects of the present concepts, temporally following the representation of the screen shot of FIG. 6A.
Figure 7:
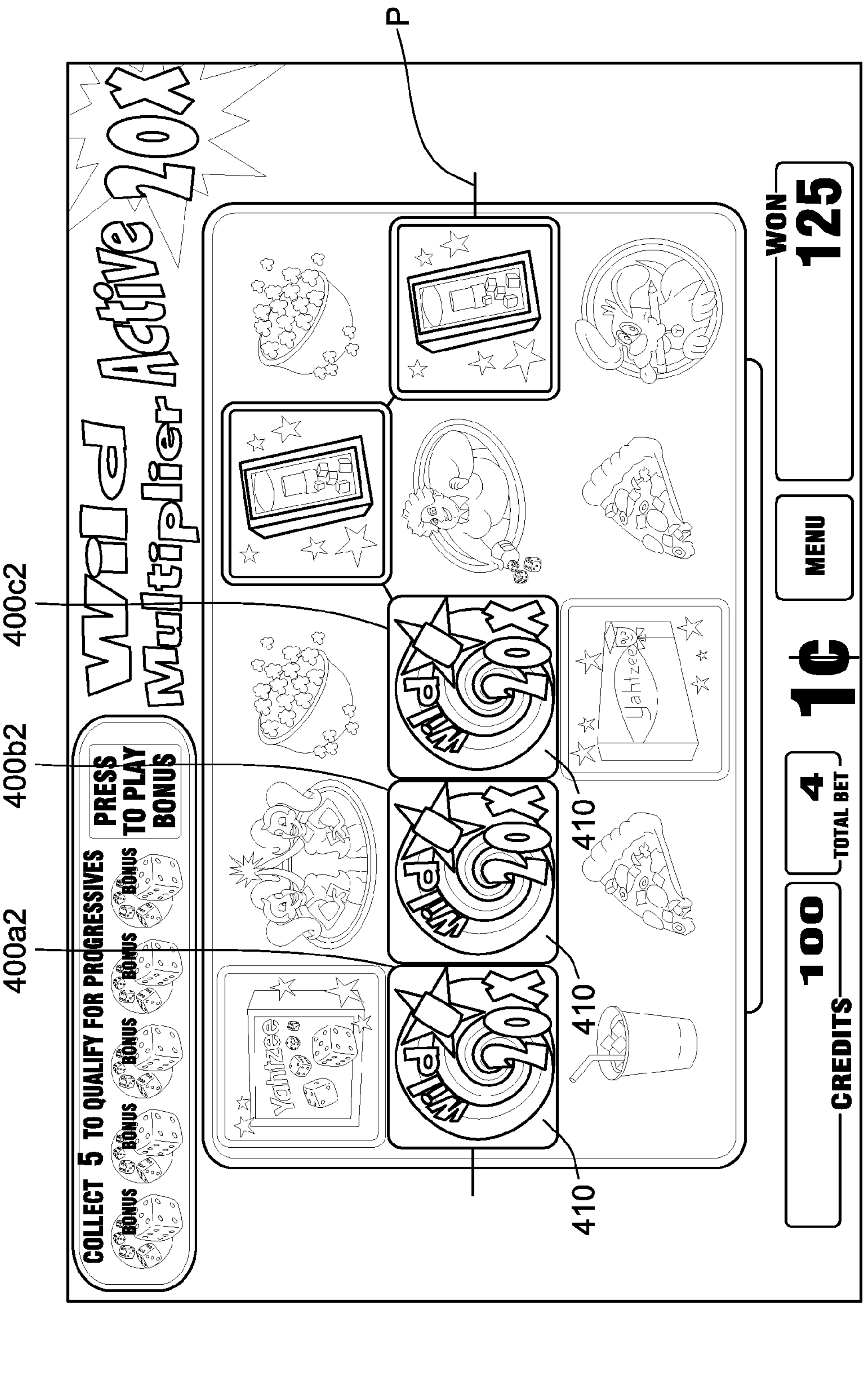
FIG. 7 is a representation of a screen shot from an exemplary wagering game, in accord with at least some aspects of the present concepts, temporally following the representation of the screen shot of FIG. 6B.
Figure 8:
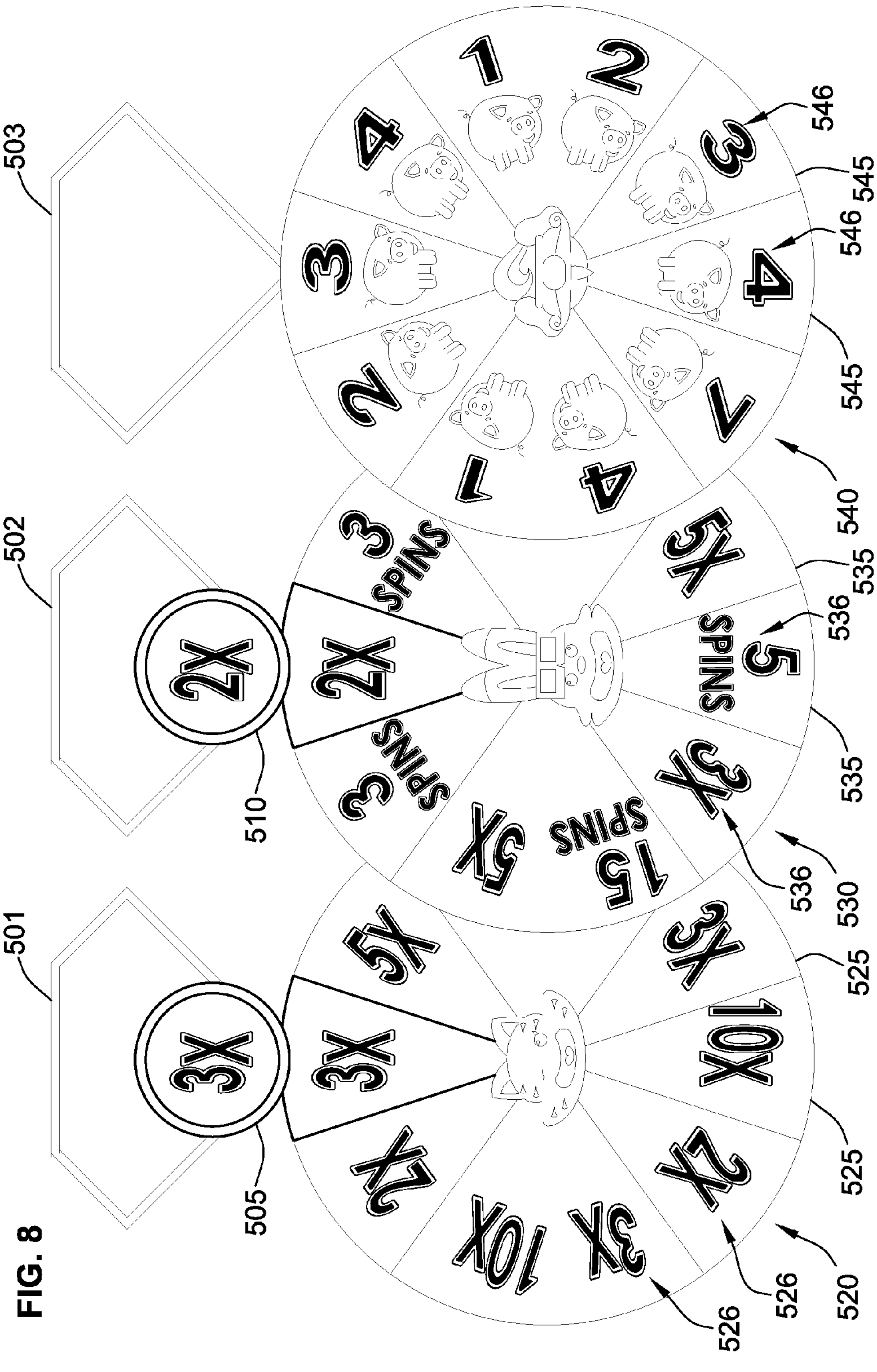
FIG. 8 is another representation of a screen shot from an exemplary wagering game, in accord with at least some aspects of the present concepts, that can be played, for example, on the gaming terminals of FIG. 1A or 1B, or the gaming system of FIG. 2.
Figure 9:
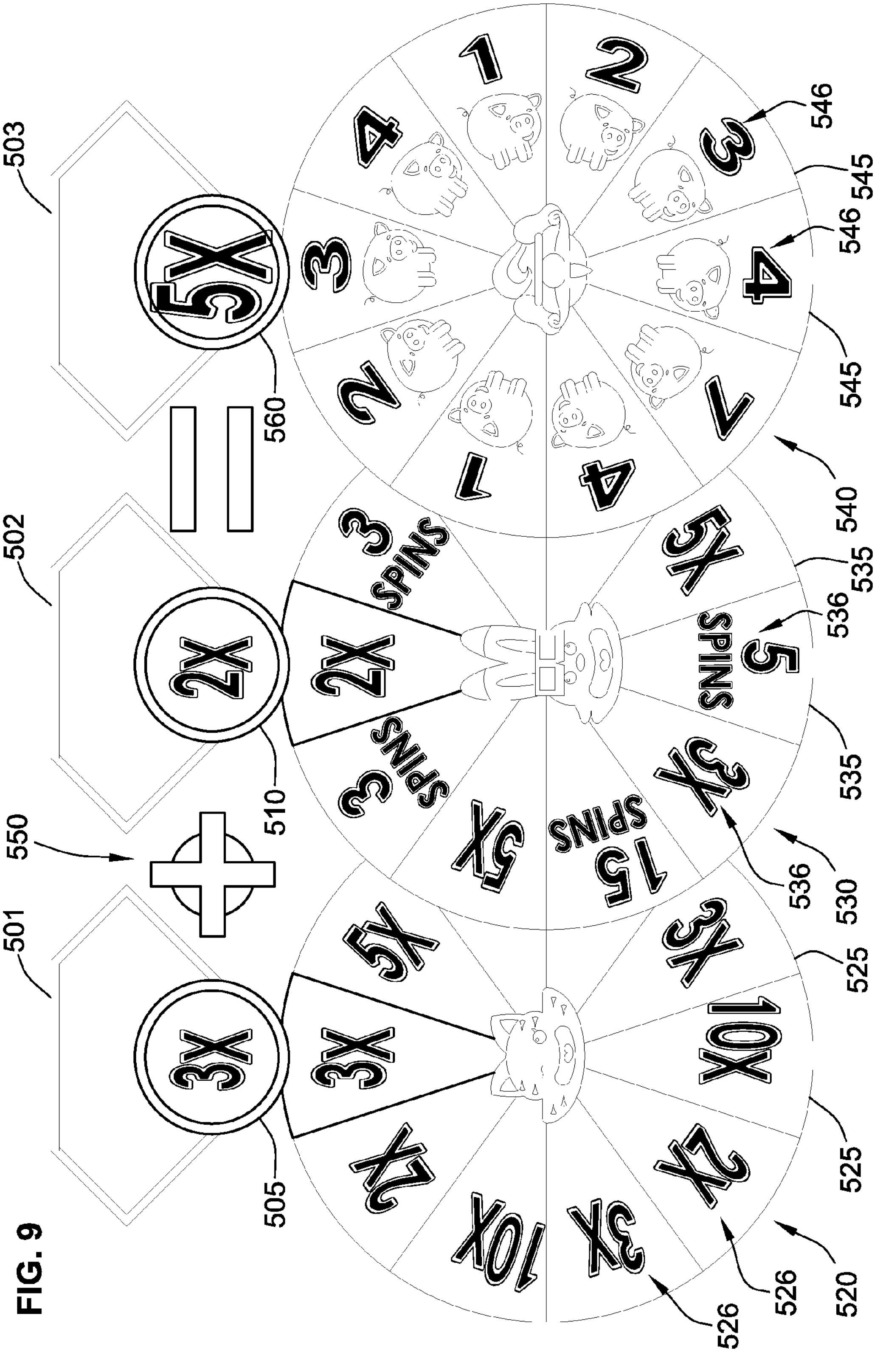
FIG. 9 is a representation of a screen shot from an exemplary wagering game, in accord with at least some aspects of the present concepts, temporally following the representation of the screen shot of FIG. 8.
Figure 10:
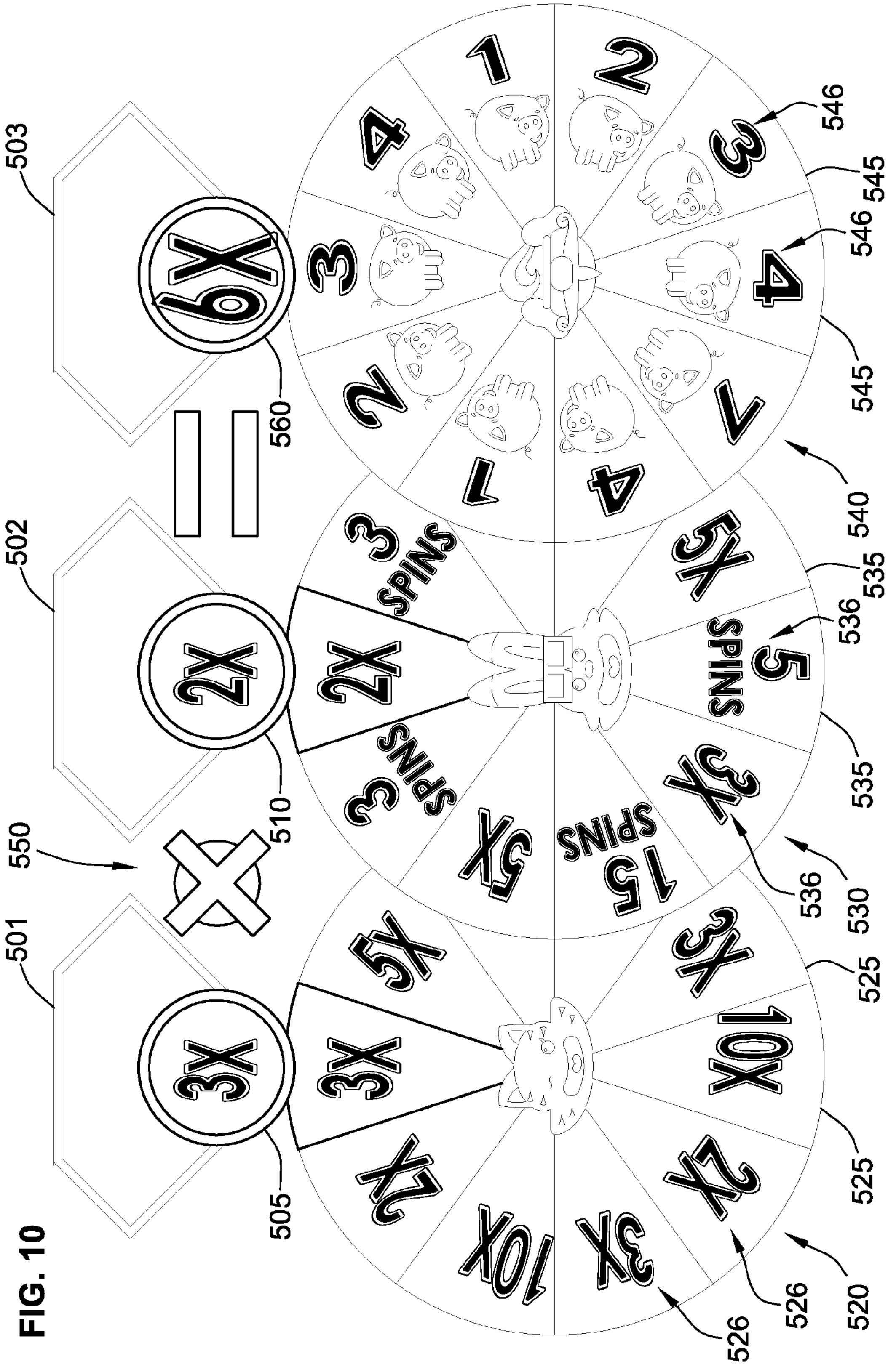
FIG. 10 is a representation of a screen shot from an exemplary wagering game, in accord with at least some aspects of the present concepts, temporally following the representation of the screen shot of FIG. 9.

In accord with the "WILD MULTIPLIER" feature depicted in the example of FIGS. 4-7, a "WILD" symbol 410 forming a part of a winning combination triggers the "WILD MULTIPLIER" feature described herein with respect to the illustrative example of FIGS. 4-7 and with respect to the illustrative example of FIGS. 8-10. If it is, the dice cup in the upper right corner begins to shake and appears in front of the reels. FIG. 4 shows a winning combination comprising a plurality of "WILD" symbols 410. In at least some aspects of the present concepts, a single "WILD" symbol 410 forming a part of a winning combination suffices to trigger the "WILD MULTIPLIER" feature. Of course, other triggering mechanisms for the "WILD MULTIPLIER" feature may be used such as, but not limited to, a single symbol appearing anywhere on the displayed wagering game outcome, a single symbol appearing in a predetermined symbol position on the displayed wagering game outcome, a single symbol appearing along an active payline, a plurality of predetermined symbols appearing anywhere on the displayed wagering game outcome (e.g., scattered), a plurality of predetermined symbols appearing in predetermined symbol positions on the displayed wagering game outcome, a plurality of predetermined symbols (e.g., a first winning combination of symbols, a second winning combination of symbols, etc.) appearing along an active payline, etcetera.

Figure 5:
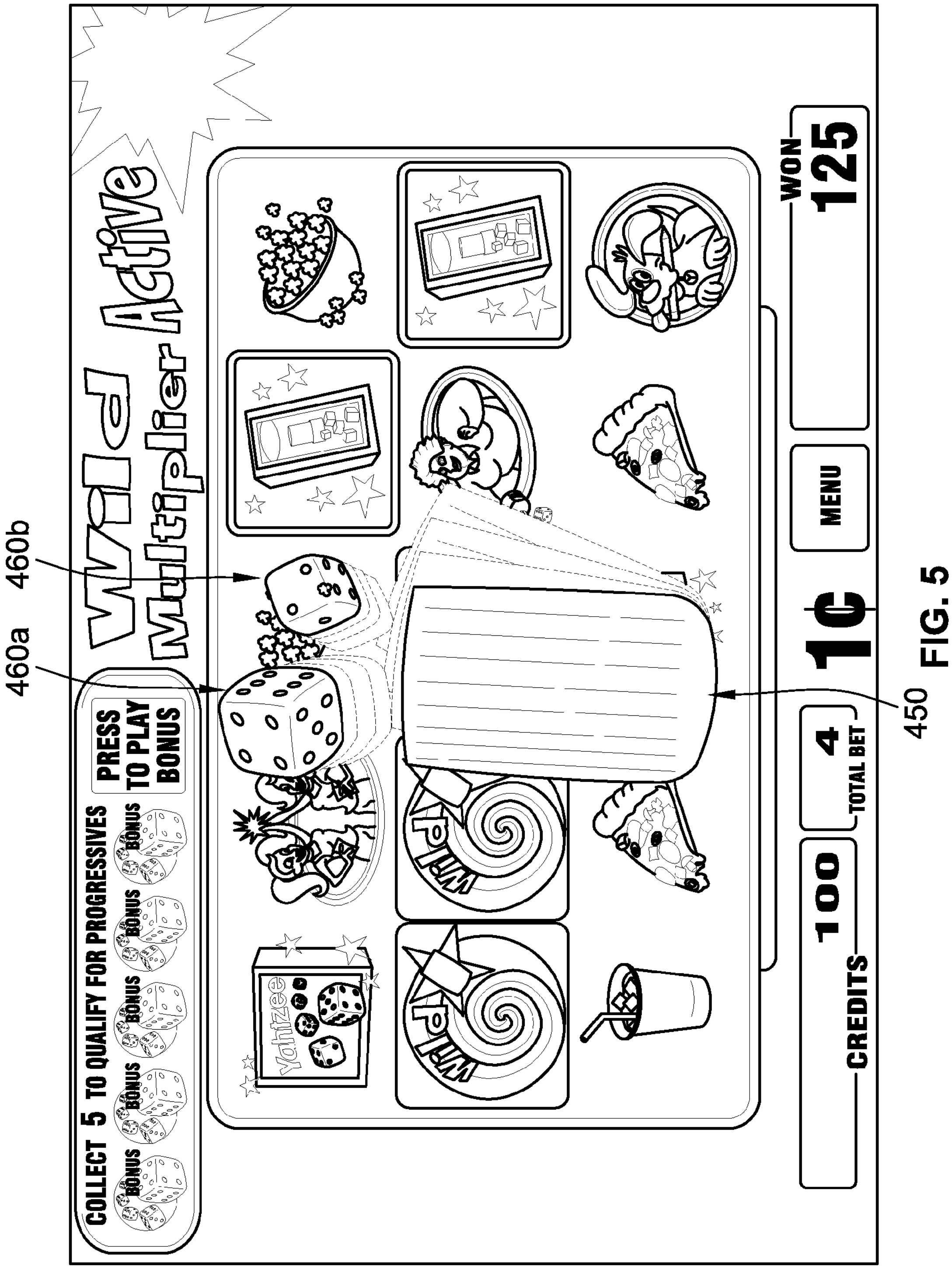
FIG. 5 is a representation of a screen shot from an exemplary wagering game, in accord with at least some aspects of the present concepts, temporally following the representation of the screen shot of FIG. 4.

FIG. 4 shows that, responsive to the triggering event for the "WILD MULTIPLIER" feature, here the appearance of more than one "WILD" symbol 410 in a winning combination, the dice cup 450 in the upper right corner of the display begins to shake, represented by the dashed outlines of the dice cup 450. Following the initial shaking of dice cup 450, the dice cup 450 then moves toward the center of the display, in the illustrated example, and "rolls" or outputs two dice 460*a*, 460*b*, consistent with the illustrated Yahtzee theme. Again, the dashed outlines for both the dice cup 450 and the two dice 460*a*, 460*b* represent motion thereof. The two dice 460*a*, 460*b* tumble in a conventional fashion to reveal the outcomes thereof (e.g., 4 pips and 5 pips), and may be represented on the same screen or on another screen in the continued play of the "WILD MULTIPLIER" feature. In the present example, the outcomes of the dice 460*a*, 460*b* "rolled" in FIG. 5 are represented on a different screen (e.g., a top screen on secondary display 16 or 16'), as shown in FIGS. 6A-6B, which depict background art of a desired theme and various progressive game meters 402*a*-402*h*. Again, it is to be understood that this illustrated progressive game meters are entirely arbitrary and are intended to illustrate general concepts, not actual game mathematics.

As shown in FIGS. 6A-6B, the dice 460*a*, 460*b* are positioned generally adjacent one another with a randomly determined mathematical or arithmetic operator 470 positioned therebetween. In one example, the randomly determined mathematical operator 470 is, initially, an "X", that then spins (or alternatively morphs, fades in and out, or otherwise changes in some visual fashion), as indicated by the dashed outlines of the "X", to then stop as resulting in either a "X" or a "+" when it stops. In another example, the set of operands (e.g., any combination of two or more of "+", "−", "x", "/", etc.) associated with the randomly determined mathematical operator 470 is presented on a spinning reel or wheel that rotates and then stops to reveal the mathematical operator to be applied. In yet another example, the set of operators (e.g., any combination of two or more of "+", "−", "x", "/", etc.) associated with the randomly determined mathematical operator 470 are presented in a pick field (not shown) of selectable elements, such pick field either being displayed generally adjacent the dice 460*a*, 460*b* or being displayed on another screen or on another portion of the screen. In at least one aspect, one or more mathematical operators 470 can be selected from a pick field of selectable elements. In another aspect, the values to be acted upon by the mathematical operator 470 (i.e., the operand) can themselves be selected from a pick field of selectable elements. In yet another aspect, both the mathematical operator 470 and the values to be acted upon by the mathematical operator are selected from respective pick fields of selectable elements.

In accord with the randomly determined mathematical operator 470, the resulting formula (e.g., "4×5") is then calculated to determine the multiplier to be applied to the WILD symbols in the wagering game of FIG. 4. As shown in FIG. 6A, as the randomly determined mathematical operator 470 spins, the resultant wild multiplier 480 is likewise shown to change, via dashed lines, between the possible outcomes of either 9X or 20X. In other words, in the illustrated example of 4 pips (die 460*a*) and 5 pips (die 460*b*), the possible outcomes would be 9X ("4+5") or 20X ("4×5").

In FIG. 6B, the randomly determined mathematical operator 470 has stopped spinning, morphing, or otherwise changing, and is revealed to have, as its randomly determined outcome, a value of "X". Accordingly, the resultant wild multiplier 480 in this example is the product of the illustrated 4 pips (die 460*a*) and 5 pips (die 460*b*), which yields the multiplier of 20X.

The randomly determined mathematical operator 470 is configured to spin, morph, fade in and out, or otherwise change between various ones of a plurality of available states. In this example, there are two states described ("X" and "+"). In other embodiments, additional states could be utilized and different combinations of states could be utilized, without limitation. For example, a wagering game in accord with the present concepts could include randomly determined mathematical operators 470 of multiplication, addition, division, and/or subtraction, in any combination.

Following the determination of the resultant wild multiplier 480, the resultant wild multiplier 480 is then utilized in the prior screen shot of the wagering game in-progress of FIG. 4, such as is shown by way of example in FIG. 7, which shows the resultant wild multiplier 480 of "20X" incorporated into each of the "WILD" symbols 410 along the payline "P". Once the resultant wild multiplier 480 is determined, the wins are evaluated with the appropriate multiple applied. For example, the value of "20X" is applied to the award or win amount in the pay table corresponding to the outcome occurring along the payline "P".

Although the randomly determined mathematical operator 470 is randomly determined, a player may be optionally permitted to take part in the determination process. For example, a player may be presented with a picking game wherein a player selects one available selectable element (e.g., a blind pick) from a displayed plurality of available selectable elements, with a different mathematical operator 470 being associated with each of the available selectable elements. In another example, a player may be presented with a skill-stop feature wherein a player actuates a player input device at a moment selected by the player and the result is associated with the players' input to the input device. For example, the randomly determined mathematical operator 470 may be presented on a rotating reel or wheel that a player has to stop by pressing a stop button. Thus, the randomly determined mathematical operator 470 may optionally be determined in a number of manners, one or more of which may be presented in any particular wagering game.

The example of FIGS. 4-7, above, were described and illustrated in association with a base wagering game. However, the concepts disclosed above and elsewhere herein are equally applicable to a bonus game outcome. For example, a trigger in a displayed symbol array of a free spin bonus game is configured to activate the "WILD MULTIPLIER" feature. Similar to the example above, dice 460*a* and 460*b* are "rolled" in a given game theme (e.g., MONOPOLY, YAHTZEE, etc.) and are represented on the same screen or on a different screen and are shown in relation to a randomly determined mathematical operator 470. The randomly determined mathematical operator 470 is then moved, morphed, or otherwise changed between a plurality of various states before revealing a final state. The resulting formula is then calculated to determine the multiplier to be applied to the WILD symbols, or the like, in such a bonus game, however determined. In other words, the bonus game awards are not necessary tied to a payline, per se, and the awards may be tied to additional winning outcomes along a payline that was active in the base wagering game or, alternatively, the award in such a free spin basis may be determined in another conventional manner.

Thus, in accord with the above, a game feature is provided in which a randomly selected mathematical operation/operator/function (e.g., addition, multiplication, subtraction, division, etc.), whether selected randomly by the game controller or selected by a player (e.g., blind pick), is applied to one or more operands or factors (e.g., numbers, numbers of free spins, multipliers, non-monetary prizes, or combinations thereof) to determine a multiplier or modifier to be applied to an award, or to supplement an award, in a base wagering game and/or a bonus game.

In any of the variants of this concept disclosed above and disclosed herein, the randomly selected mathematical operation/function (e.g., 470) can be portrayed on the primary display, secondary display, area display, or other display in a variety of ways (e.g., player blind pick, reel, wheel, rotating cross, etc.).

FIGS. 8-10 show another example of aspects of the present concepts. In this example, a plurality of wheels 520, 530, 540 are shown. Each of these wheels 520, 530, 540 is subdivided into a plurality of subsegments 525, 535, and 545, respectively. As shown, wheel 520 is divided into 10 subsegments 525, wheel 530 is divided into 10 subsegments 535, wheel 540 is divided into 10 subsegments 545. On each of the subsegments of the various wheels 520, 530, 540, are provided various indicia 526, 536, and 546, respectively. On the subsegments of wheel 520 are provided various multiplier values from 2X-10X, as shown, and on the subsegments of wheel 530 are provided both, alternatingly, various multiplier values and free spin values. On the subsegments of wheel 540 are provided various numbers, here 1-7.

Shown above the wheel 520, 530, 540 of FIGS. 8-10 are shown a variety of indicators, with indicator 505 being disposed over wheel 520, indicator 510 being disposed over wheel 530, and indicator 560 being disposed over wheel 530. These indicators 505, 510 and 560 are depicted in association with pointers 501, 502, 503, which point to, in the embodiment shown, a top dead center position of the respective wheels, where the outcome of each of the wheels 520, 530, 540 is determined when the respective wheels stop. Thus, for example, the indicia 526 on subsegment 525 of wheel 520 at the top dead center position adjacent the pointer 501 is a "3X", which is then represented in indicator 505 as the first multiplier value and the indicia 536 on subsegment 535 of wheel 530 at the top dead center position adjacent the pointer 502 is a "2X", which is then represented in indicator 515 as the second multiplier value.

Consistent with the prior example of FIGS. 4-7, a randomly determined mathematical operator 550 is positioned between the indicators 505 and 515. The randomly determined mathematical operator 550 may optionally appear prior to, concurrent with, or following the reveal of one or more of the values of the rotating wheels 520, 530, 540. As with the prior example of FIGS. 4-7, the randomly determined mathematical operator 550 is, initially, an "X", that then spins (or alternatively morphs, fades in and out, or otherwise changes in some visual fashion) and stops to reveal either an "X" or a "+" as the mathematical operator acting on the values displayed in the indicators 505, 515.

The randomly determined mathematical operator 550 was randomly determined. In other aspects, the randomly determined mathematical operator 550 is determined by a player. For example, a player may be presented with a picking game wherein a player selects one available selectable element (e.g., a blind pick) from a displayed plurality of available selectable elements. In another example, a player may be presented with a skill-stop feature wherein a player actuates a player input device at a moment selected by the player and the result is associated with the players' input to the input device. Thus, the randomly determined mathematical operator 550 may optionally be determined in a number of manners, one or more of which may be presented in any particular wagering game.

As shown in FIG. 9, the randomly determined mathematical operator 550 is a "+" and the resulting formula is then "3X+2X=5X", with the "5X" multiplier value being displayed in the indicator 560. This "5X" multiplier value is then applied to the award value associated with the outcome determined in the wagering game or bonus game, or other game feature, triggering the game feature of FIGS. 8-10. The triggering game need not be a "WILD MULTIPLIER" feature as described above by way of example. Instead, for example, the entry into the game feature of the type shown in FIGS. 8-10 may occur by having any predetermined single symbol appear anywhere on the displayed wagering game outcome, a single symbol appearing in a predetermined symbol position on the displayed wagering game outcome, a single symbol appearing along an active payline, a plurality of predetermined symbols appearing anywhere on the displayed wagering game outcome (e.g., scattered), a plurality of predetermined symbols appearing in predetermined symbol positions on the displayed wagering game outcome, a plurality of predetermined symbols (e.g., a first winning combination of symbols, a second winning combination of symbols, etc.) appearing along an active payline.

FIG. 10 shows an example, further to FIG. 8 and similar to FIG. 9, wherein the randomly determined mathematical operator 550 is revealed to be an "X" operator. Accordingly, the value of "3X" represented in indicator 505 and the value of "2X" represented in indicator 515 are then multiplied together to yield a product of "6X", shown in indicator 560.

In still further alternate configurations, a game feature of the type shown in FIGS. 8-10 may randomly occur (e.g., a "mystery" trigger). Moreover, the game feature of the type shown in FIGS. 8-10 may omit the multiplier values (e.g., "2X", "3X,", etc.) borne by the wheels 520, 530, or other such vehicles (e.g., reel, etc.) for displaying changing values, and include only free spins or credit values, for example. Thus, is such a variant, a wheel or reel bearing free spin values (see, e.g., wheel 530), credit values, dollar values, or non-monetary prizes, could be multiplied by or added to, based on a randomly determined mathematical operator 550, a number (see, e.g., wheel 540) to yield a total number of free spins, credit values, dollar values, non-monetary prizes, or the like.

As with the example of FIGS. 4-7, the randomly determined mathematical operator 550 is configured to spin, morph, fade in and out, or otherwise change between various ones of a plurality of available states. In this example of FIGS. 8-10 as well, there are two states described ("X" and "+") for brevity. In other embodiments, additional states could be utilized and different combinations of states could be utilized, without limitation. For example, a wagering game in accord with the present concepts could include randomly determined mathematical operators 550 of multiplication, addition, division, and/or subtraction, in any combination. As noted above, the set of operators (e.g., any combination of two or more of "+", "−", "x", "/", etc.) associated with the randomly determined mathematical operator 550 may be presented on a spinning reel or wheel that rotates and then stops to reveal the mathematical operator to be applied or may be presented in a pick field (not shown) of selectable elements, such pick field either being displayed generally adjacent the indicators 505, 510 or being displayed on another screen or on another portion of the screen.

Thus, in accord with the above, a game feature is provided in which a randomly selected mathematical operation/operator/function (e.g., addition, multiplication, subtraction, division, etc.), whether selected randomly by the game controller or selected by a player (e.g., blind pick), is applied to one or more factors (e.g., numbers, numbers of free spins, multipliers, non-monetary prizes, or combinations thereof) to determine a multiplier or modifier (e.g., a wild multiplier, award multiplier, spin multiplier, etc.) to be applied to an award or to supplement an award in a base wagering game and/or a bonus game.

FIGS. 8-10 show a wheel 540 comprising a plurality of subsegments 545, each subsegment bearing indicia 546 which are whole numbers ranging from 1-7. In the example of FIGS. 8-9, wheel 540 did not take part in the determination of the modifiers illustrated in indicator 560. In other aspects, however, wheel 540 could be utilized in lieu of or in addition to the other wheels 520, 530. For example, three or more wheels or reels or the like are provided and a subset of the reels are activated to determine the multiplier or modifier in combination with the randomly determined mathematical operator 550. In such an embodiment, reels 520 and 530 could be activated in a first game feature, reels 530 and 540 could be activated in a second game feature later in the player's gaming session, and reels 520 and 540 could be activated in a third game feature still later in the player's gaming session. Thus, while two indicated values are displayed in indicators 505, 510, these values could be randomly determined from values randomly determined from amongst a plurality of wheels or reels, which may themselves be randomly selected or selected based on a triggering event or game performance parameters (e.g., wager level, player game history, outcome in base wagering game, etc.). The plurality of wheels or reels themselves may optionally be configured to have higher or lower levels of values so that one or more of such wheels or reels are clearly more desirable than others, either individually or in combination. In yet another variant, all of the wheels or reels could spin and a "Best 2-out-of-3" scheme implemented wherein the most advantageous combination is made to maximize the player's award.

In still another variant, the multiplier or modifier "5X" (FIG. 9) or "6X" (FIG. 10) acts directly on the indicia 546 on subsegment 545 adjacent pointer 503. Thus, in FIG. 9, the number "3" next to the indicator 560 yields a final value of "15X" and, in FIG. 10, the number "3" next to the indicator 560 yields a final value of "18X". This value may then be applied to an award or to supplement an award in a base wagering game and/or a bonus game.

In yet another variant, the multiplier or modifier "5X" (FIG. 9) or "6X" (FIG. 10) acts directly on the indicia 546 on subsegment 545 adjacent pointer 503, with the indicia 546 itself representing a credit amount or a dollar amount. In this case, the number "3" next to the indicator 560 could indicate a dollar amount, for example, yielding a final value of "15" dollars and, in FIG. 10, the number "3" next to the indicator 560 yields a final value of "18" dollars. This value may then be applied to an award or to supplement an award in a base wagering game and/or a bonus game.

Although the wheels 520, 530, 540 are shown to be equal in size and possess equal numbers of subsegments, the wheels may alternatively be of different size, different partitioning (a greater or lesser number of subsegments), or different size and different partitioning.

In another embodiment, the randomly determined mathematical operators 470, 550 are optionally be replaced by one or more logical (e.g., "AND", "NOT", etc.) operators in combination with a plurality of means for determining operators in the determinations discussed above. For example, where there are 6 displayed reels, the final total multiplier could be the sum total of the indicia shown in a pertinent portion of the reels, however determined, with the logical operators being randomly determined (e.g., reel 1 AND reel 2 NOT reel 3 NOT reel 4 AND reel 5 NOT reel 6, wherein the award would be the sum of reels 1, 2, and 5).

In yet another embodiment, a number of wheels (e.g., 520, 530, etc.) or reels or the like can be provided in a number corresponding to the number or reels in the base wagering game and the number of wheels or reels activated in the game feature for randomly determining operands corresponds to the number of triggering symbols in the game or bonus from which the game feature is triggered. For example, the three "WILD" symbols occurring along a winning payline in FIG. 4 could cause three wheels or reels to be activated in the game feature, which would then require the controller to randomly determine two mathematical operators to use on the three operands. Thus, as the number of triggering symbols increases, the good fortune to the player increases correspondingly.

In still other aspects, instead of the random determination of the first operand using a first physical (or simulated) movable member and the random determination of the second operand using a second physical (or simulated) movable member, such as shown in FIGS. 8-10, the random determination of the first and/or second operand may be simulated by the display of a graphically morphing or changing numbers or characters.

Figure 11:
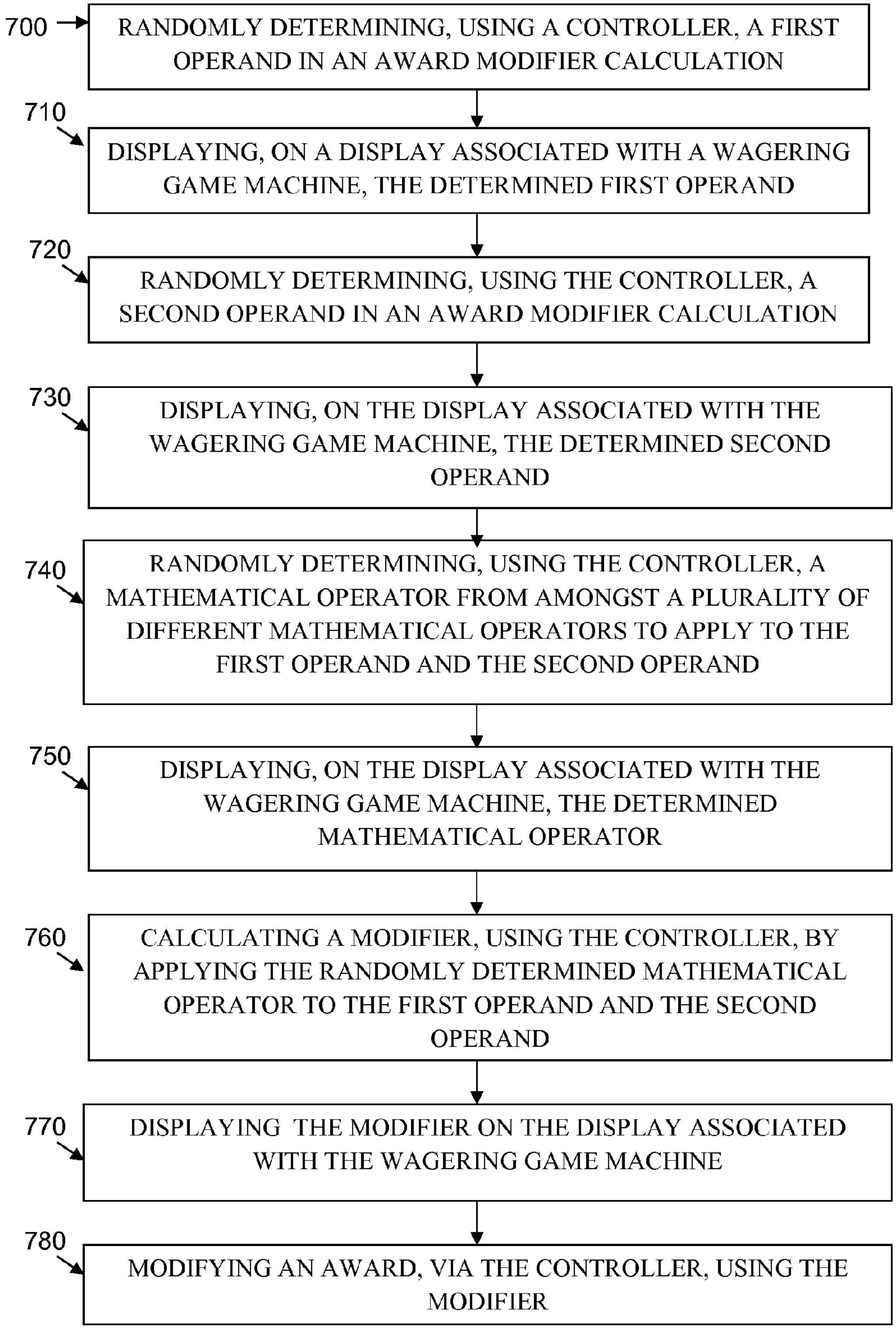
FIG. 11 is a flowchart for an exemplary algorithm that corresponds to instructions that can be executed by a controller in accord with at least some aspects of the disclosed concepts.

The present concepts further include, as shown in FIG. 11, a method for conducting a wagering game on a wagering game system, such as that shown in FIGS. 1A-2, comprising one or more wagering game machines 10, 10' comprising the act 700 of randomly determining, using a controller 42, a first operand in an award modifier calculation, such as that described above with respect to FIGS. 8-10, and the act 710 of displaying on a display (e.g., 14, 16) associated with a wagering game machine (e.g., 10), the determined first operand. The method also includes the act 720 of randomly determining, using the controller, a second operand in an award modifier calculation and the act 730 of displaying, on the display associated with the wagering game machine, the determined second operand. The method further includes the act 740 of randomly determining, using the controller, a mathematical operator from amongst a plurality of different mathematical operators to apply to the first operand and the second operand and the act 750 of displaying, on the display associated with the wagering game machine, the determined mathematical operator. The method further includes the act 760 calculating a modifier, using the controller, by applying the randomly determined mathematical operator to the first operand and the second operand and the act 770 of displaying the modifier on the display associated with the wagering game machine. The method further includes the act 780 modifying an award, via the controller, using the modifier.

While currently preferred embodiments and best modes for carrying out the present invention have been described in detail above, those familiar with the art to which this invention relates will recognize various alternative designs and embodiments for practicing the invention within the scope of the appended claims. Merely by way of example, any number of operands and any number of mathematical operators may be employed (e.g., a single operand could be squared, etc.). Many embodiments, however, would have n operands with n−1 mathematical operators, where n represents any integer. It is further noted that the present concepts expressly include embodiments where, of n−1 mathematical operators, only one mathematical operator is randomly determined or where a plurality of the mathematical operators are randomly determined. Stated different, the present concepts do not require each mathematical operator is randomly determined, merely that at least one mathematical operator is randomly determined. Further, as to the operands, it is to be understood that all of the operands could comprise credit values. Thus, the wheels, reels, selectable elements in a picking field, or the like (see, e.g. FIG. 8) could display a variety of credit values.

What is claimed is:

1. A gaming system for playing a wagering game, comprising:
- at least one wagering game machine configured to conduct the wagering game; and
- at least one controller operatively configured to:
  - randomly generate an outcome of the wagering game;
  - determine if the outcome is a winning outcome;
  - determine an award associated with the winning outcome;
  - activate a game feature responsive to a winning outcome satisfying one or more predetermined triggers;
  - randomly determine a first operand in an award modifier calculation;
  - display the determined first operand on at least one display device associated with the wagering game machine;
  - randomly determine a second operand in an award modifier calculation;
  - display the determined second operand on said at least one display device associated with the wagering game machine;
  - randomly determine a mathematical operator from amongst a plurality of different mathematical operators to apply to the first operand and the second operand;
  - display the determined mathematical operator on said at least one display device associated with the wagering game machine;
  - apply the randomly determined mathematical operator to the first operand and the second operand to yield a modifier;
  - display the modifier on said at least one display device associated with the wagering game machine;
  - modify the award associated with the winning outcome, using the modifier, to yield a modified award; and
  - award the modified award via the wagering game machine.

2. The gaming system of claim 1, wherein the modifier comprises one of a multiplier, a credit value, and a number of free spins.

3. The gaming system of claim 1, wherein the random determination of the first operand in an award modifier calculation is displayed on a first physical or simulated movable member and the random determination of the second operand in an award modifier calculation is displayed on a second physical or simulated movable member.

4. The gaming system of claim 1, wherein the random determination of the mathematical operator comprises an outcome randomly determined by the controller or randomly determined by a player selection of a selectable element from a picking field of selectable elements, at least some of which being associated with mathematical operators.

5. The gaming system of claim 4, wherein the random determination of the mathematical operator comprises an outcome randomly determined by the controller and wherein the randomly determined mathematical operator is graphically represented by one of a spinning physical or simulated reel, a spinning physical or simulated wheel, or a changing symbol.

6. The gaming system of claim 1, wherein the controller is further operatively configured to:
- modify an award operatively associated with the winning outcome via a paytable by applying the modifier to each of the at least one predetermined symbol occurring in the winning outcome to yield a modified award; and
- award the modified award.

7. The gaming system of claim 1, wherein the plurality of different mathematical operators comprises an operator for addition.

8. The gaming system of claim 7, wherein the plurality of different mathematical operators comprises an operator for multiplication.

9. A wagering game system configured to conduct a wagering game or one or more wagering game machines, the wagering game system comprising:
- at least one wagering game machine configured to conduct the wagering game; and
- at least one controller, operatively associated with the at least one wagering game machine, configured to conduct a game feature, upon execution of instructions:
  - randomly determine, in association with the game feature, a first operand in an award modifier calculation;
  - display, in association with the game feature, the determined first operand on a display device associated with the wagering game machine;
  - randomly determine, in association with the game feature, a second operand in the award modifier calculation;
  - display, in association with the game feature, the determined second operand on the display device associated with the wagering game machine;
  - randomly determine, in association with the game feature, a mathematical operator from amongst a plurality of different mathematical operators to apply to the first operand and the second operand in the award modifier calculation;
  - display, in association with the game feature, the determined mathematical operator on the display device associated with the wagering game machine;
  - apply, in association with the game feature, the randomly determined mathematical operator to the first operand and the second operand in the award modifier calculation to yield a modifier;
  - display, in association with the game feature, the modifier on the display device associated with the wagering game machine;
  - modify, using the modifier, an award operatively associated with a winning outcome in a game other than the game feature to yield a modified award; and
  - award the modified award.

10. The gaming system of claim 9, wherein the modifier comprises one of a multiplier, a credit value, and a number of free spins.

11. The gaming system of claim 9, wherein the random determination of the first operand in an award modifier calculation is displayed on a first physical or simulated movable member, wherein the random determination of the second operand in an award modifier calculation is displayed on a second physical or simulated movable member.

12. The gaming system of claim 11, wherein the first physical or simulated movable member is graphically represented by one of a spinning physical or simulated reel or a spinning physical or simulated wheel, and wherein the second physical or simulated movable member is graphically represented by one of a spinning physical or simulated reel or a spinning physical or simulated wheel.

13. The gaming system of claim 9, wherein the random determination of the mathematical operator comprises an outcome randomly determined by the controller or randomly determined by a player selection of a selectable element from a picking field of selectable elements, at least some of which being associated with mathematical operators.

14. The gaming system of claim 9, wherein the controller is further operatively configured to:

modify an award operatively associated with the winning outcome via a paytable by applying the modifier to each of the at least one predetermined symbol occurring in the winning outcome to yield a modified award; and award the modified award.

15. The gaming system of claim 9, wherein the controller is further operatively configured to execute the acts of claim 9 subsequent to the controller performing the following:

randomly generate an outcome of the wagering game;

determine if the outcome is a winning outcome;

activate, for a winning outcome, the game feature responsive to an occurrence of at least one predetermined symbol occurring in the winning outcome.

16. A wagering game system configured to conduct a wagering game or one or more wagering game machines, the wagering game system comprising:

at least one wagering game machine; and at least one controller, operatively associated with the at least one wagering game machine, configured to conduct a game feature, upon execution of instructions:

randomly determine, in association with the game feature, a first operand in an award modifier calculation;

display, in association with the game feature, the determined first operand on a display device associated with the wagering game machine;

randomly determine, in association with the game feature, a second operand in an award modifier calculation;

display, in association with the game feature, the determined second operand on the display device associated with the wagering game machine;

randomly determine, in association with the game feature, a mathematical operator from amongst a plurality of different mathematical operators to apply to the first operand and the second operand;

display, in association with the game feature, the determined mathematical operator on the display device associated with the wagering game machine;

apply, in association with the game feature, the randomly determined mathematical operator to the first operand and the second operand to yield a result;

display, in association with the game feature, the result on the display device associated with the wagering game machine.

17. The gaming system of claim 16, modify, using said at least one controller, a randomly determined outcome using the result to yield an award; and award the award.

18. The gaming system of claim 17, wherein the result is a modifier that comprises at least one of a multiplier, a credit value, and a number of free spins.

19. The gaming system of claim 17, wherein the mathematical operator is randomly determined from a group comprising two or more of a multiplication operator, an addition operator, a division operator, and a subtraction operator.

20. The gaming system of claim 18, wherein the modifier comprises at least one of a multiplier, a credit value, and a number of free spins.

21. The gaming system of claim 19, wherein the random determination of the mathematical operator comprises an outcome randomly determined by the controller or randomly determined by a player selection of a selectable element from a picking field of selectable elements, at least some of which being associated with mathematical operators.

22. The gaming system of claim 19, wherein the random determination of the mathematical operator comprises an outcome randomly determined by the controller and wherein the randomly determined mathematical operator is graphically represented by one of a spinning physical or simulated reel, a spinning physical or simulated wheel, or a changing symbol.

23. A method for conducting a wagering game on a wagering game system comprising one or more wagering game machines, the method comprising:

triggering a game feature in association with a wagering game conducted on a wagering game machine of the wagering game system;

randomly determining, using a controller for the wagering game system, a first operand in an award modifier calculation;

displaying, on a display associated with a wagering game machine, the determined first operand;

randomly determining, using the controller, a second operand in an award modifier calculation;

displaying, on the display associated with the wagering game machine, the determined second operand;

randomly determining, using the controller, a mathematical operator from amongst a plurality of different mathematical operators to apply to the first operand and the second operand;

displaying, on the display associated with the wagering game machine, the determined mathematical operator;

calculating a modifier, using the controller, by applying the randomly determined mathematical operator to the first operand and the second operand;

displaying the modifier on the display associated with the wagering game machine;

modifying an award, via the controller, using the modifier; and awarding the modified award via the wagering game machine.

24. The method for conducting a wagering game on a wagering game system according to claim 23, wherein the modifier comprises one of a multiplier, a credit value, and a number of free spins.

25. The method for conducting a wagering game on a wagering game system according to claim 23, wherein the act of randomly determining the first operand in the award modifier calculation is displayed on a first physical or simulated movable member and wherein the act of randomly determining the second operand in the award modifier calculation is displayed on a second physical or simulated movable member.

26. The method for conducting a wagering game on a wagering game system according to claim 23, wherein first physical or simulated movable member comprises one of a spinning physical or simulated reel, a spinning physical or simulated wheel, or a changing symbol, and wherein the second physical or simulated movable member comprises one of a spinning physical or simulated reel, a spinning physical or simulated wheel, or a changing symbol.

27. The method for conducting a wagering game on a wagering game system according to claim 23, wherein the act of randomly determining the mathematical operator comprises receiving a player selection of a selectable element from a displayed picking field of selectable elements, at least some of the selectable elements being associated with randomly determined mathematical operators.

28. The method for conducting a wagering game on a wagering game system according to claim 23, wherein the triggering of the game feature occurs in association with a base wagering game.

29. The method for conducting a wagering game on a wagering game system according to claim 23, wherein the triggering of the game feature occurs in association with a bonus game.

30. The method for conducting a wagering game on a wagering game system according to claim 23, wherein the award that is modified using the modifier comprises at least one of an award associated with a winning outcome in a base wagering game, an award associated with an award outcome in a bonus game, or an award associated with the triggered game feature.

* * * * *